United States Patent [19]

Yusa

[11] Patent Number: 4,565,677
[45] Date of Patent: Jan. 21, 1986

[54] METHOD FOR PURIFYING RAW MATERIAL GAS FOR USE IN SEMICONDUCTOR MANUFACTURING AND PURIFIER FOR USE IN SAID METHOD AND METHOD OF MANUFACTURING SAID PURIFIER

[75] Inventor: Atsushi Yusa, Kamiina, Japan

[73] Assignee: Olympus Optical Company Limited, Tokyo, Japan

[21] Appl. No.: 622,757

[22] Filed: Jun. 20, 1984

[30] Foreign Application Priority Data

Jul. 1, 1983 [JP] Japan ............................ 58-120646

[51] Int. Cl.$^4$ ........................................... C01B 13/00
[52] U.S. Cl. .................................... 423/219; 423/299; 423/325; 423/347
[58] Field of Search ............... 423/119, 299, 347, 325, 423/219

[56] References Cited

U.S. PATENT DOCUMENTS 1,681,702  8/1928  Yost ..................................... 423/219
2,547,874  4/1951  Klema ................................. 423/219
2,826,480  3/1958  Webster .............................. 423/219
4,353,788  10/1982  Jeffrey et al. .................... 423/347 X

OTHER PUBLICATIONS

Nebergall et al., "College Chemistry", Raytheon Education Company, Boston, 1968, p. 451.

Primary Examiner—John Doll
Assistant Examiner—Jackson Leeds
Attorney, Agent, or Firm—Parkhurst & Oliff

[57] ABSTRACT

A purifier for purifying a raw material gas for use in manufacturing semiconductor devices is formed by a hydrogenated amorphous substance of an element selected from a group consisting of Si, Ge, P and As whose hydride gas is used as the raw material gas. This purifier is used for purifying the raw material gas to be purified in such a manner that the raw material gas is brought into contact with the purifier comprising the hydrogenated amorphous substance which is maintained at a temperature a little lower than the decomposition temperature of the raw material gas to efficiently remove the small amount of oxygen from the raw material gas.

16 Claims, 2 Drawing Figures

METHOD FOR PURIFYING RAW MATERIAL GAS FOR USE IN SEMICONDUCTOR MANUFACTURING AND PURIFIER FOR USE IN SAID METHOD AND METHOD OF MANUFACTURING SAID PURIFIER

BACKGROUND OF THE INVENTION

The present invention relates to a method and an apparatus for purifying a raw material gas for use in manufacturing a semiconductor device, and also to a purifier used in said purifying method and a method of manufacturing said purifier.

In the process for manufacturing semiconductor devices, there has been known to form amorphous or mono- or poly-crystalline film of semiconductor material such as Si, Ge, P and As by using a metal hydride gas such as monosilane ($SiH_4$), disilane ($Si_2H_6$), germanium hydride ($GeH_4$), phosphorus hydride ($PH_3$) and arsenic hydride ($AsH_3$).

For instance, an amorphous hydrogenated silicon which is a kind of amorphous semiconductor material has been used as a solar cell, a photo-sensor, a thin-film transistor, etc., and the field of application therefor has gradually widened. Since the maximum light absorption spectrum of amorphous hydrogenated silicon is situated at a shorter wavelength as compared with crystal silicon, the hydrogenated amorphous silicon is preferably used as a photoelectric transducer such as a solar cell and photosensor, and the hydrogenated amorphous silicon has been used on a commercial basis. However, a drawback of such a transducer is that its characteristics become deteriorated during usage. For example, if strong light is made incident upon the hydrogenated amorphous silicon it becomes highly resistive. Therefore, the photoelectric converting efficiency of the transducer comprising the hydrogenated amorphous silicon is decreased. This effect has been well known as the Steabler-Wronski effect whose mechanism remains almost unknown, and thus various studies about this effect have been carried out from the points of view of a manufacturing method, a growth condition, an included impurity, etc. of the hydrogenated amorphous silicon.

Recently, it has been found that the oxygen contained in the hydrogenated amorphous silicon film is a large contributer to the Steabler-Wronski effect. Usually, hydrogenated amorphous silicon is produced by a glow discharge decomposition method using a monosilane gas ($SiH_4$). In the hydrogenated amorphous silicon film produced in this manner, oxygen is present in about a 200 ppm atomic ratio ($1 \times 10^{19}$ atoms/cc Si). In the manufacturing process, oxygen is absorbed in the film during the glow discharge, and a source of the oxygen is regarded as $O_2$ and $H_2O$ in the monosilane gas ($SiH_4$) and $O_2$, $H_2O$ remain in the reaction vessel system. Actually, in commercially available monosilane gas, oxygen sometimes comprises about 1~10 ppm, and if use is made of the hydride gas mentioned above as the raw mateial gas, oxygen is included in the hydrogenated amorphous silicon film over 200 ppm. Therefore, in order to decrease the oxygen amount in the hydrogenated amorphous silicon film to an amount smaller than 1 ppm, it is necessary to decrease the amount of oxygen contained in the monosilane gas below the order of 0.1 ppm.

Generally, in order to remove a small amount of oxygen contained in the raw material gas, use is made of a metal-carrier catalyst. The metal-carrier catalyst is effective in the case where the raw material gas to be purified is not decomposed in the presence of a catalyst like the deoxygenation from a hydrogen gas, a nitrogen gas or an argon gas. However, this metal-carrier catalyst is not so effective for the deoxygenation in the monosilane gas, because the catalyst becomes inactive due to the monosilane gas. The monosilane gas is easily decomposed into silicon and hydrogen on the metal-carrier catalyst and the decomposed silicon is segregated on the catalyst carrier and functions to deteriorate the hydrogen absorption efficiency. Therefore, such metal-carrier catalyst cannot be used effectively for the deoxygenation of the raw material gas for use in manufacturing semiconductor devices such as monosilane, disilane, germanium hydride gas, phosphorus hydride gas, and arsenic hydride gas.

SUMMARY OF THE INVENTION

The present invention has for its object to provide a novel and useful method of purifying a raw material gas for use in manufacturing semiconductor devices, in which method the oxygen contained in the gas can be removed efficiently.

It is another object of the invention to provide a method of purifying a raw material gas for use in manufacturing semiconductor devices, in which method the oxygen contained in the raw material gas can be removed efficiently and the amount of hydrogen contained in the purified gas can be controlled precisely.

According to the invention, a method of purifying a raw material gas for use in manufacturing semiconductor devices comprises:
  preparing a purifier comprising a carrier and a hydrogenated amorphous substance of at least one element selected from a group consisting of silicon, germanium, phosphorus and arsenic and deposited on said carrier;
  heating the purifier at a given temperature; and
  bringing the raw material gas into contact with the heated purifier to remove the oxygen contained in the raw material gas.

It is another object of the invention to provide an apparatus for carrying out the above mentioned method of purifying a raw material gas for use in manufacturing semiconductor devices.

It is another object of the invention to provide an apparatus for purifying a raw material gas for use in manufacturing semiconductor devices, in which a purifier can be also manufactured by using the raw material gas.

According to the invention, an apparatus for purifying a raw material gas for use in manufacturing semiconductor devices comprises:
  an inlet pipe from which the raw material gas to be purified is introduced into the apparatus;
  an oxygen absorption tank having an inlet connected to the inlet pipe and an outlet connected to an outlet pipe and containing a purifier comprising a carrier and a hydrogenated amorphous substance of at least one element selected from Si, Ge, P and As deposited on the carrier; and
  a heater arranged around the oxygen absorption tank for heating the purifier at a given temperature, whereby a purified raw material gas is supplied from the outlet pipe.

It is another object of the invention to provide a novel and useful purifier for use in the above mentioned method of purifying a raw material gas for use in manufacturing semiconductor devices.

According to the invention, a purifier for purifying a raw material gas for use in manufacturing semiconductor devices comprises a carrier and a hydrogenated amorphous substance of at least one element selected from a group consisting of Si, Ge, P and As and deposited on said carrier.

It is still another object of the invention to provide a method of manufacturing the above mentioned purifier for purifying a raw material gas for use in manufacturing semiconductor devices.

According to the invention, a method of manufacturing a purifier for purifying a raw material gas for use in manufacturing semiconductor devices comprises:

charging a carrier in a reaction tank, introducing into the reaction tank a hydride gas of at least one element selected from Si, Ge, P and As under the existence of an excitation energy to deposit on the carrier a hydrogenated amorphous substance of at least one element selected from Si, Ge, P and As.

The present invention is based on the following recognition. As explained above, the hydrogenated amorphous silicon film functions to selectively absorb the oxygen from a gas. According to the invention, this oxygen absorbing characteristic of the hydrogenated amorphous silicon film is utilized effectively to remove the oxygen contained in the raw material gas for use in manufacturing semiconductor devices below a required level. That is, when use is made of a purifier comprising a hydrogenated amorphous substance having the same characteristics as that of the hydrogenated amorphous silicon film mentioned above, it is possible to reduce the oxygen concentration in a raw material gas, e.g. a monosilane ($SiH_4$) below 0.1 ppm. In this case, when the purifier is made of a hydrogenated amorphous substance whose hydride gas is to be purified, any contamination of the purified gas due to the purifier itself does not occur at all. However, the present invention is not limited to such a method. For instance, a purifier comprising hydrogenated amorphous silicon may be used for purifying a germanium, phosphorus or arsenic hydride gas. Moreover, use may be made of a purifier comprising a mixture of more than two hydrogenated amorphous substances.

DESCRIPTION OF THE PREFERRED EMBODIMENTS

Figure 1:
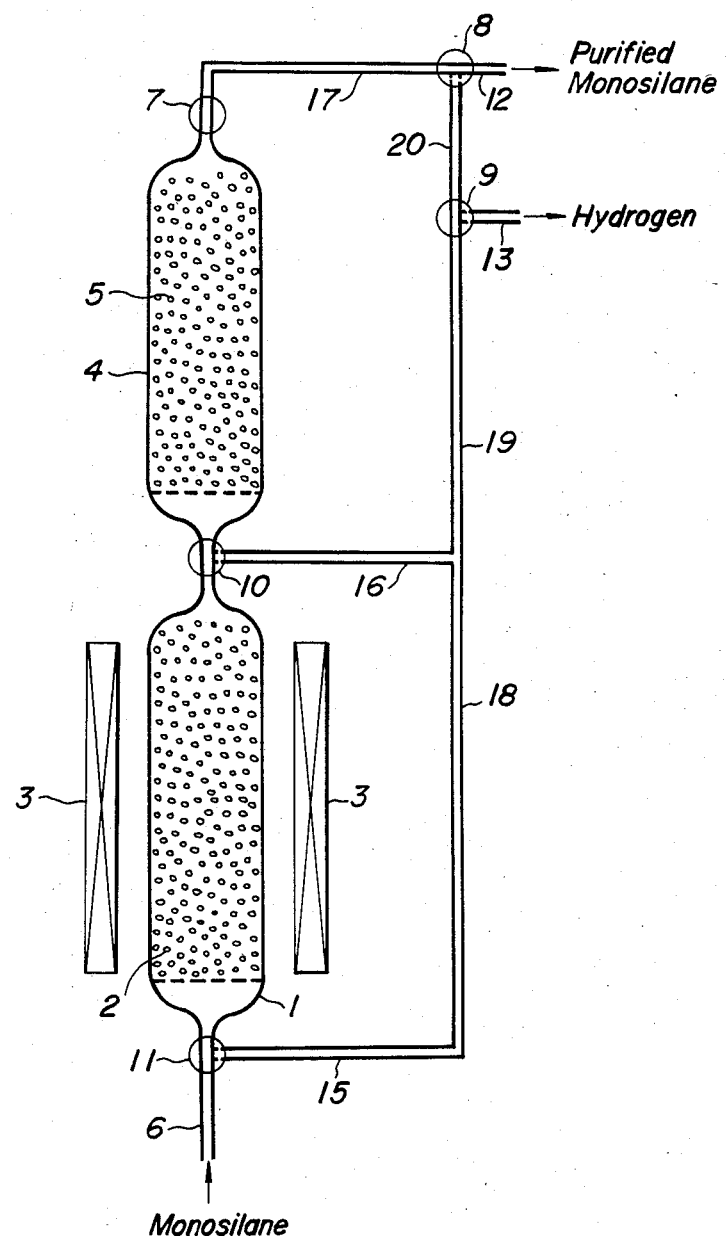
FIG. 1 is a schematic view showing one embodiment of the apparatus according to the invention, for purifying a raw material gas for use in manufacturing semiconductor devices.

FIG. 1 is a schematic view showing one embodiment of the apparatus according to the invention for purifying a monosilane gas ($SiH_4$) for use in manufacturing silicon semiconductor devices. In this embodiment, the purifier consisting of a carrier and a hydrogenated amorphous silicon deposited on the carrier is formed in the purifying apparatus itself. However, it should be noted that the present invention is not limited to such an embodiment, and the purifying apparatus may be charged with a purifier which has been previously formed by another purifier manufacturing apparatus. In the present purifying apparatus, there is provided an oxygen absorption tank 1 (reaction tank) in which a carrier 2 having a large specific surface is charged. The carrier 2 may be made of fine particles of silicon, quartz wools, alumina powder, etc. Since the oxygen absorbing efficiency becomes larger corresponding to an increase of the specific surface of the carrier 2, it is preferable to use a carrier having a particle size or dimension as small as possible. A heater 3 such as a tungsten heater or an infrared lamp heater is arranged around the oxygen absorption tank 1. There is further provided a water absorption tank 4 containing a water absorbent 5 such as a $K^+$ ion-exchange A type zeolite (commercial name: Molecular Sieves 3A) for removing a water component in the monosilane gas. An inlet of the tank 4 is connected to an outlet of the oxygen absorption tank 1 via a three-way valve 10. An inlet of the tank 2 is coupled with an inlet pipe 6 via a three-way valve 11. An outlet of the tank 4 is connected to an outlet pipe 12 through a valve 7, a pipe 17 and a three-way valve 8. The pipe 17 is further connected to a vent 13 through a pipe 20 and a three-way valve 9 and the vent 13 is also coupled with the outlet of the tank 1 via the three-way valve 10, the purging pipes 16 and 19 and the three-way valve 9, as well as to the inlet pipe 6 via the three-way valve 11, by-path pipes 15 and 18, the purging pipe 19 and the three-way valve 13.

Now, the method for manufacturing the purifier consisting of the carrier 2 and the hydrogenated amorphous silicon deposited thereon will be first explained. The oxygen absorption tank 1 is heated to a temperature of 300° to 450° C. above the thermal decomposition temperature of the monosilane gas, and then the unpurified monosilane gas flow through the oxygen absorption tank 1 from the inlet pipe 6 through the three-way valve 11. The monosilane gas that flows into the oxygen absorption tank 1 is thermally decomposed into amorphous silicon (a-Si) and hydrogen gas ($H_2$), and the hydrogenated amorphous silicon (hereinafter abbreviated as a-Si:H) is deposited on a surface of the carrier 2, the decomposed hydrogen gas is discharged from the vent 13 through the three-way valve 10, purging pipes 16 and 19 and the three-way valve 9. After the surface of the carrier 2 is sufficiently covered with the a-Si:H, the three-way valve 10 is operated to that the oxygen absorption tank 1 is connected to the water absorption tank 4, and then the three-way valve 11 is closed to stop the flow of the monosilane to be purified. Next, the temperature of the oxygen absorption tank 1 is decreased, by controlling the heater 3, to a temperature of, for example, 200° to 250° C. at which the monosilane is not thermally decomposed. In this case, it is possible to set the temperature at room temperature, but it is preferable to set the temperature as high as possible to make the oxygen absorption efficiency large. However, it should be noted that the temperature cannot be increased above the temperature at which the monosilane is decomposed. If the monosilane to be purified is decomposed, the purified silane includes the hydrogen ($H_2$), although the oxygen absorption efficiency becomes larger. However, in an embodiment which will be explained later with reference to FIG. 2, the tank 1 is heated to a temperature higher than the decomposition temperature. Then, the monosilane to be purified flow through the three-way valve 11, the oxygen absorption tank 1, the three-way valve 10 and the water absorption tank 4 to produce the purified and dried monosilane. The thus purified and dried monosilane is supplied from the outlet 12 through the valve 7, the pipe 17 and the three-way valve 8 to an apparatus for forming hydrogenated amorphous silicon films on substrates. In the case of effecting the purging before the purified silane is further supplied to the apparatus for manufacturing hydrogenated amorphous silicon films, the purified silane is once discharged from the vent 13 by operating the three-way valves 8 and 9.

In the embodiment so far explained, use is made of monosilane ($SiH_4$) as the raw material gas which is used to produce the silicon semiconductor devices, but it is also possible to use disilane ($Si_2H_6$), germanium hydride ($GeH_4$), phosphorus hydride ($PH_3$), or arsenic hydride ($AsH_3$). Therefore, in the purifying method according to the invention, the hydrogenated amorphous substance of at least one element selected from a group consisting of Si, Ge, P and As is maintained at a temperature a little lower than the temperature at which the raw material is decomposed, and the raw material gas to be purified is brought into contact with the a-Si:H carrier to remove a small amount of impurity from the raw material gas. Moreover, as for the the carrier material, use is made of the materials having a large specific surface such as quartz wool, silicon powder and alumina powder, but the present invention is not limited to the embodiment mentioned above. For example, it is possible to use a porous material such as zeolite or carbon molecular sieves having a large specific inner surface and a pore diameter larger than that of the raw material gas such as the monosilane, and the hydrogenated amorphous substance may be deposited on the pore. Further, in the above embodiment, use is made of the purifier consisting of the carrier and the hydrogenated amorphous silicon deposited thereon, but when germanium hydride, phosphorus hydride or arsenic hydride are used as the raw material gas, it is preferable to use another purifier consisting of a carrier and a hydrogenated amorphous substance of germanium, phosphorus or arsenic, respectively. However, a hydrogenated amorphous substance of a different element than that of the raw material hydride gas may be used. Further a mixture of hydrogenated amorphous substances may be also used.

Moreover, as for the heater 3, it is not always necessary to use a tungsten heater. For example, if the oxygen absorption tank 1 is made of a transparent material such as glass or quartz, it is possible to effect the heating by an infrared lamp. Heating by infrared lamp makes it possible to form a uniform hydrogenated amorphous substance as compared with heating by a tungsten heater. Further, in the embodiment mentioned above, the hydrogenated amorphous silicon film is deposited on the carrier by thermal decomposition of the monosilane gas, but methods other than thermal decomposition may be utilized. For example, the decomposition can be performed by radiation excitation using a laser emitting visible light, an Hg lamp or a halogen lamp such as Xe, or by plasma excitation.

Figure 2:
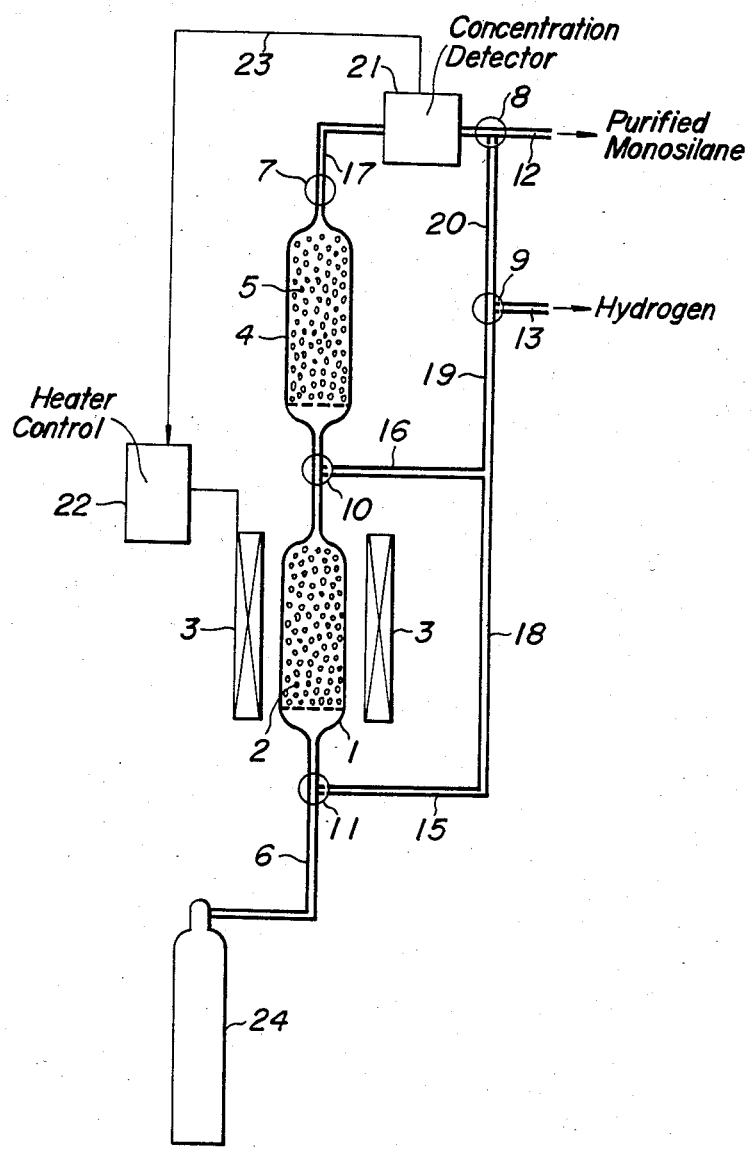
FIG. 2 is a schematic view illustrating another embodiment of the purifying apparatus according to the invention.

FIG. 2 is a schematic view showing another embodiment of the apparatus for purifying the raw material gas according to the invention. In FIG. 2, portions similar to those shown in FIG. 1 are denoted by the same reference numerals illustrated in FIG. 1. Also in this embodiment, the purifier consisting of a carrier 2 and a hydrogenated amorphous substance of silicon, germanium, phosphorus or arsenic is first manufactured in an oxygen absorption tank 1 by using a raw material gas to be purified. To this end, the carrier 2 in the tank 1 is heated to a temperature above the thermal decomposition temperature of the monosilane and the monosilane flows through the tank 1. Then, hydrogenated amorphous silicon (a-Si:H) is deposited on the carrier 2. In this manner, the purifier is first prepared. Then, the thus formed purifier in the tank 1 is heated by a heater 3 to a temperature of about 300° to 350° C. slightly higher than the thermal decomposition temperature of the monosilane to be purified. Then the raw material monosilane gas is introduced from the reservoir tank 24 and is brought into contact with the purifier consisting of the carrier and the hydrogenated amorphous silicon deposited thereon. Then, the oxygen remaining in the raw material monosilane gas is effectively absorbed by the purifier. At the same time, the monosilane ($SiH_4$) is partially decomposed into silicon and hydrogen. Therefore, hydrogen is contained in the purified monosilane. However, the amount of hydrogen in the purified monosilane gas can be always kept to a given constant value by controlling the thermal input in response to the concentration of the purified monosilane gas as will be explained later. In the present embodiment, the temperature inside the oxygen absorption tank 1 is set at the temperature at which the monosilane gas will partially decompose. As mentioned above, when the oxygen absorption temperature becomes higher, the oxygen absorption efficiency is improved. However, since hydrogen gas is included in the purified monosilane, it is not possible to obtain a completely purified monosilane which includes no hydrogen gas. However, there is a case when the purified monosilane including a little amount of hydrogen gas can be preferably used for the CVD apparatus for manufacturing crystalline silicon semiconductor devices, because in this case the monosilane gas is generally used after being diluted with Ar, He or $H_2$ gas. However, in this case, it is necessary to keep the amount of hydrogen contained in the purified monosilane at a constant value. Therefore, in the embodiment shown in FIG. 2, a silane concentration detector 21 using a thermal conductivity detector cell is arranged in the middle of the pipe 17 to detect the concentration of the purified silane supplied from the silane tank 24 through the oxygen absorption tank 1 and the water absorption tank 4, and an electric signal representing a deviation of the detected silane concentration from a predetermined value is supplied to a heater controlling device 22 via a signal line 23 so as to control the output power of the heater 3. When the detected concentration of the purified silane is larger than the predetermined value, the input power to the heater 3 is made correspondingly larger. Contrary to this, when the concentration is smaller than the predetermined value, the input power is made correspondingly smaller. In this manner, it is possible to keep the amount of hydrogen in the purified silane constant.

In the embodiment shown in FIG. 2, since the purifier is heated to a temperature slightly above the decomposition temperature of the monosilane during the purifying operation, the process for preparing the purifier and the process for purifying the monosilane can be carried out continuously, while the temperature inside the tank 1 is maintained always a little higher than the thermal decomposition temperature of the monosilane gas. Moreover, it is also possible to treat other raw material gas such as germanium hydride, phosphorus hydride and arsenic hydride.

As mentioned above, according to the invention, since use is made of a purifier consisting of a carrier and a hydrogenated amorphous substance deposited thereon for purifying a hydride gas such as monosilane ($SiH_4$), disilane ($Si_2H_6$), germanium hydride ($GeH_4$), phosphorus hydride ($PH_3$) and arsenic hydride ($AsH_3$) the following advantages can be obtained:

(1) The oxygen removing efficiency can be made larger. That is to say, it is possible to remove the oxygen in the hydride gas to a trace level.

(2) Since the hydride gas is not decomposed by the purifier according to the invention in contrast to the known metal-carrier catalyst, the purifier is not made inactive due to decomposed substances and thus the life of the purifier can be made longer.

(3) Since the purifier consists of a carrier on which the hydrogenated amorphous substance obtained by decomposing the monosilane gas to be purified is deposited, it is possible to perform an activation or a re-activation of the purifier in an easy manner.

(4) In the case of purifying the monosilane gas by means of the purifier formed by the hydrogenated amorphous substance of silicon itself, there occurs no problem of the contamination due to the purifier.

(5) The hydrogenated amorphous silicon transducer elements formed by using the monosilane or the disilane ($Si_2H_6$) purified by the method according to the invention can have extremely improved characteristics and reliability as compared with the element formed by using unpurified monosilane or disilane.

(6) Since the purifier according to the invention can be prepared by means of the apparatus for purifying the raw material gas, the purifying process can be performed easily at a low running cost.

What is claimed is:

1. A method for purifying a raw material gas for use in manufacturing semi-conductor devices, comprising:
   (a) preparing a purifier by:
      (i) charging an oxygen absorption tank with a high surface area carrier;
      (ii) heating the carrier to a temperature greater than a thermal decomposition temperature of at least one gaseous hydride of at least one element selected from the group consisting of silicon, germanium, phosphorus and arsenic;
      (iii) flushing said heated carrier with said at least one hydride, thereby depositing on said carrier a hydrogenated amorphous layer of said at least one element;
   (b) heating said purifier to a predetermined temperature; and
   (c) bringin raw material gas into contact with the heated purifier to remove any oxygen contained in the raw material gas.

2. A method according to claim 1, wherein said raw material gas comprises a hydride of an element selected from silicon, germanium, phosphorus and arsenic.

3. A method according to claim 2, wherein said hydrogenated amorphous layer is formed by the same element whose hydride gas is used as the raw material gas.

4. A method according to claim 2, wherein said purifier is heated to a temperature below the thermal decomposition temperature of the raw material gas.

5. A method according to claim 2, wherein said purifier is heated to a temperature slightly higher than the thermal decomposition temperature of the raw material gas.

6. A method according to claim 5, wherein contacting said raw material gas with said purifier produces purified hydride gas and hydrogen gas, and wherein the relative concentrations of the purified hydride gas and the hydrogen gas are detected and the temperature of the purifier is controlled in accordance with the detected relative concentrations such that the concentration of the purified hydride gas with respect to the hydrogen gas remains constant.

7. A method according to claim 4, wherein the hydrogenated amorphous layer comprises a hydrogenated amorphous silicon, the raw material gas is formed by a silane, and the purifier is heated to a temperature of about 200° to 250° C.

8. A method according to claim 6, wherein said hydrogenated amorphous layer comprises a hydrogenated amorphous silicon, the raw material gas comprises a silane, and the purifier is heated to a temperature of about 300° to 350° C.

9. A method of making a purifier for purifying a raw material gas for use in manufacturing semi-conductor devices, comprising:
   charging an oxygen absorption tank with a high surface area carrier;
   heating the carrier to a temperature greater than a thermal decomposition temperature of at least one gaseous hydride of at least one element selected from the group consisting of silicon, germanium, phosphorus and arsenic;
   flushing said heated carrier with said at least one hydride, thereby depositing on said carrier a hydrogenated amorphous layer of said at least one element.

10. A method according to claim 9, wherein said gaseous hydride comprises the raw material gas to be purified.

11. A method according to claim 10, wherein said carrier is heated to the temperature higher than a thermal decomposition temperature of the gaseous hydride.

12. A method according to claim 10, wherein said gaseous hydride is decomposed by excitation radiation.

13. A method according to claim 10, wherein said gaseous hydride is decomposed by excitation plasma.

14. A purifier produced according to the method of claim 9, for purifying raw material gas for use in manufacturing semi-conductor devices.

15. A purifier according to claim 14, wherein said carrier comprises a material having a large specific surface selected from the group consisting of fine particle silicon, quartz wool and alumina powder.

16. A purifier according to claim 14, wherein said carrier comprises a porous material having a large specific inner surface selected from the group consisting of zeolite and carbon molecular sieves.

* * * * *